3,063,906
BENZYL DEXTRAN-AMPHETAMINE AND
METHOD OF MAKING SAME
Herman C. N. Heckel, Oxford, and Robert T. Jefferson, Jr., Dayton, Ohio, assignors to The Central Pharmacal Company, Seymour, Ind.
No Drawing. Filed Sept. 13, 1960, Ser. No. 55,724
9 Claims. (Cl. 167—82)

This invention relates to a method of improving the release rate of drugs, and more particularly with respect to the utilization of benzyl dextran free of benzyl alcohol in the preparation of sustained release pharmaceutical products.

An object of the invention is to provide a method of preparing benzyl dextran compositions with amphetamine or its salts which exhibit an improved release rate of the drug.

A further object is to provide a medicinal drug product of the character described which can be taken orally, for example in the form of a pill or capsule, and which releases the drug slowly over a 24 hour period whereby only one pill or capsule of the drug need be taken each day to obtain the desired treatment.

In accordance with the present invention, it has been discovered unexpectedly that the presence of benzyl alcohol in benzyl dextran compositions with amphetamine adversely affects the rate of release of drugs contained in the same; for example, the rate of release of amphetamine hydrochloride in the presence of benzyl alcohol is lowered to such an extent that it becomes much too low for practical purposes.

When the physiological action of the drugs is required over a long period of time it is convenient to take an amount sufficient for 8, 12 or 24 hours in one dose. This can only be done through use of a slow release product. Otherwise, to keep the drug at the desired level of physiological activity, one would have to take doses at frequent intervals. The present invention eliminates the need of frequent doses.

Benzyl dextran is normally prepared by reaction of dextran with benzyl chloride in the presence of sodium hydroxide, and a considerable amount of benzyl alcohol is formed. Further, since benzyl alcohol is a solvent, for benzyl dextran, it is very difficult to remove.

The presence of benzyl alcohol in the resinous benzyl dextran mass also lowers the softening point of the resinous mass to a marked extent. For instance, when benzyl alcohol is present in amounts greater than about 5% by weight of the powdered resin, the same is no longer free flowing but cakes. This results in rendering the resin unsuitable for most purposes.

To remove benzyl alcohol from benzyl dextran resin, the latter must be thoroughly washed with water and water-methanol solution mixtures. A preferred method comprises steam distilling the reaction mixture containing benzyl dextran, excess benzyl chloride and benzyl alcohol. This removes the benzyl alcohol along with the excess benzyl chloride.

An added procedure for removing excess benzyl alcohol involves adding methanol to the dried benzyl to form a soft paste or gel. This paste or gel is then washed with excess methanol to free it of benzyl alcohol. The benzyl resin paste is insoluble in excess methanol thus making it possible to use methanol to wash out the benzyl alcohol.

In conventional drugs of the prior art which are compounded for oral administration, the same are absorbed rapidly in the stomach and intestinal tract and thus produce a relatively high concentration of the drug in the blood stream in a short period of time. This rapid release and absorption into the blood stream of the drug is undesirable except in special cases. The rapid release and the building up of a high concentration of the drug often produces undesirable physiological and pharmacological reactions, and the desired effects of the drug are not produced.

The present invention makes it possible to overcome this difficulty and provides an improved pharamaceutical drug product which, when taken orally, slowly liberates the drug in the stomach and intestinal tract for absorption into the blood stream. This rate is controlled whereby the drug remains effective over a relatively long period of time, and the undesirable abnormal physiological reactions, such as usually produced when the drug is rapidly released and absorbed into the blood stream, are eliminated. Also, it makes possible the use of one treatment to cover 8, 12, 24 or 36 hours.

In accordance with the present invention amphetamine, which has been used internally heretofore, as a stimulant, is combined with benzyl dextran. It is essential that the benzyl dextran be substantially free of benzyl alcohol to provide a benzyl dextran amphetamine preparation which exhibits the desirable drug-releasing properties described. Amphetamine hydrochloride is combined with benzyl dextran employing methanol or the like medium which will cause benzyl dextran to dissolve or swell forming a gel or paste and which at the same time is a solvent for the drug. The resultant homogeneous mass of amphetamine hydrochloride, methanol, and benzyl dextran is evaporated in vacuo and the dried mass ground to the desired mesh size. The resultant product when extracted for 1 hour employing simulated gastric juice, followed by extraction up to 24 hours with simulated intestinal juice, is found to give up its amphetamine content quite slowly. Thus a physiologically active level of amphetamine is maintained in the body for an extended period of 8 to 36 hours with a single medication. The benzyl alcohol content of the benzyl dextran is critical both with respect to the rate of release and extent of the release of the drug and also the free-flowing characteristics property of the prepared granules. Where benzyl alcohol is present in amounts of 4–5% or greater the amphetamine is released only to about 50% of its content in the resin whereas under similar conditions a benzyl alcohol-free resin will give up to 95% of its amphetamine content after a combined extraction of 12 to 24 hours in simulated gastric and intestinal juices.

BENZYL DEXTRAN PREPARATION

Benzyl dextran, depending upon the extent of benzylation, varies in solubility from a water-soluble to a highly water-insoluble polymer. Such water-insoluble benzyl dextran is the product with which the present invention is concerned. With a degree of substitution of 0.5 to 1.0 the polymer is soluble in benzyl alcohol but insoluble in most of the common organic solvents. Saturation of benzyl dextran powder with methanol, ethanol, dioxane, dioxalane and chloroform will cause softening and formation of a gel or paste which is insoluble in excess solvent.

The procedure for synthesizing benzyl dextran is as follows.

Example 1

Native 512 dextran (4 moles—i.e. 648 grams and such as produced by inoculation of a sucrose medium with L.m. organism as hereinafter described) was dissolved in hot water (4500 ml.) and combined with a 50% aqueous sodium hydroxide solution (480 g. NaOH). The alkaline dextran solution was heated with stirring to 80° C. Benzyl chloride (6 moles) was added slowly from a dropping funnel, then the temperature was increased to reflux. The mixture was refluxed until a soft gum-like solid separated. After cooling, the clear supernatent liquid was poured off. The separated mass was washed three or four times with water, then combined with a 50% aqueous sodium hydroxide solution (480 g. NaOH) as before. The mixture was heated, and at 80° C. benzyl chloride (6 moles) was added slowly with constant stirring. After refluxing for one hour another 6 moles of benzyl chloride was added, and refluxing was continued for one hour more. The reactants were allowed to cool, then 2 N hydrochloric acid (1000 ml.) was added carefully to neutrality (pH 6 to 7).

The product was washed several times with cold water. It was then washed with several volumes of methanol, and this was followed by a final washing with water, or the reaction mass after neutralization was steam distilled to remove the excess benzyl chloride and benzyl alcohol. The product was dried at 85° C. under vacuum and crushed to particles which could pass through a 40 mesh sieve.

The native dextran used is preferably one having an average molecular structural repeating alpha-1,6 linkage to non-alpha 1,6 linkages ratio between 2:1 and 30:1 a solubility or dispersibility in water such as to yield colloidally stable aqueous solutions.

A suitable dextran is produced enzymatically in the presence of bacteria, for example by inoculating a nutrient medium containing sucrose, particular nitrogenous compounds and certain inorganic salts with an appropriate microorganism, such as those of the *Leuconostoc mesenteroides* and *L. dextranicum* types and incubating the culture at the temperature most favorable to the growth of the particular microorganism. The dextran also may be produced enzymatically, in the substantial absence of bacteria, by cultivating an appropriate microorganism, for example, *Leuconostoc mesenteroides* B-512 to obtain a dextran-producing enzyme, separating the enzyme from the medium in which it is produced, and introducing the enzyme into a medium in which dextran is produced by action of the enzyme.

In the preparation of the benzyl dextran, the acidificaton and washing operations are extremely important. Unless all of the benzyl alcohol and/or benzyl chloride is washed from the product it is not free flowing at room temperature. The presence of benzyl alcohol also affects the rate of release of amphetamine salts compounded with the resin, greatly slowing the release to values much too small for the desired effectiveness. Benzyl dextrans containing 5% or more benzyl alcohol have softening points ranging from 53° to 87° C. as determined by the Ring and Ball method, and the slow release amphetamine products prepared from these benzyl dextrans have been found to release less than 50% amphetamine in extraction periods up to ten hours in simulated gastric and intestinal fluids.

The importance of providing for complete removal of the by-product benzyl alcohol was observed when benzyl alcohol was used as the medium in which the benzyl dextran amphetamine product was prepared. The procedure involved dissolving the benzyl dextran and amphetamine salts in benzyl alcohol, then removing the alcohol as completely as possible by vacuum distillation, taking care to avoid degradation. A number of slow release products were prepared by this method, and tested. Negligible amounts of amphetamine were extracted to periods up to 8 hours. In addition to poor extraction, it was very difficult to obtain these products in granular form. These benzyl dextran amphetamine products had softening points which were so low that chilling was required in order to break them into small granules for testing. Consequently, "shelf life" was only a matter of hours. As soon as the granules warmed to room temperature they flowed into a single agglomerate.

Benzyl dextran amphetamine preparations which were prepared as above without regard to the presence of benzyl alcohol showed a low release rate of amphetamine, and did not aproach the desired rate of approximately 35% to 50% release of the drug over a four hour period. Such products as were prepared from pure benzyl dextran released the amphetamine at a much greater rate, approximating the desired rate.

TESTING METHOD FOR RELEASE OF DRUG

The rate of extraction of amphetamine from a slow release product was measured by placing a sample (1.25 g.) of granules in simulated gastric fluid [1] (100 ml.) at 37° C. The resulting suspension was agitated on a mechanical shaker for definite time intervals then the undissolved granules were removed by filtration. These were then immediately transferred to fresh gastric fluid, or to simulated intestinal fluid [2] (100 ml.) for an additional extraction period. The filtrates were analyzed for nitrogen content by the Kjeldahl method,[3] and the percent amphetamine extracted in a given time interval from the slow release product was calculated.

Illustrative examples of preparations of slow release products for pure benzyl dextran are as follows.

Example 1

Small amounts of methanol were mixed into benzyl dextran (18.0 g., −40 mesh) until a soft plastic mass was obtained (approximately 20 ml. methanol required). Amphetamine sulfate (2.0 g.) was dissolved in water (2 ml.) and the solution was mixed into the plastic mass or gel. The amphetamine resin mass was dried at 60° C. under vacuum and the dry cake was crushed to −20+40 granules for testing.

Example 2

Same as Example 1, using half the amount of amphetamine sulfate and dissolving it directly in the alcohol suspension (no water).

Example 3

Same as Example 1, using less methanol (5 ml. total) and a ratio of 8.5 parts benzyl dextran to 1.5 parts amphetamine sulfate (no water used).

Example 4

Dextroamphetamine (0.53 g.) was added to methanol (10 ml.) and the solution was mixed into benzyl dextran (10.0 g., −40 mesh) adding it in small amounts. The soft mass was dried at 60° C. under vacuum and the dry cake was crushed to −20+40 mesh granules.

Example 5

Small amounts of dioxalane were mixed into benzyl dextran (10.0 g., −40 mesh) until a total of 10 ml. was added. The paste was heated to 90° C. and the amphetamine sulfate (1.3 g.) was added. The soft mass was dried at 60° C. under vacuum, and the dry cake was crushed to −10+20 mesh granules.

---

[1] Preparation described in The United States Pharmacopeia, 15th revision, p. 1094 (1955).
[2] Preparation described in The United States Pharmacopeia, 15th revision, p. 1095 (1955).
[3] Method of Analysis described in The United States Pharmacopeia, 15th revision, p. 909 (1955).

The extraction data obtained from tests made with the products of Examples 1 through 5 are given in Table I.

TABLE I.—AMPHETAMINE EXTRACTED FROM SLOW RELEASE PRODUCTS PREPARED WITH PURE BENZYL DEXTRAN

| Producted tested | Size of granules (mesh) | Amphet-amine in product (percent) | Amphetamine extraction in simulated gastric fluid (percent) | | Amphetamine extraction in simulated intestinal fluid (percent)[1] | | |
|---|---|---|---|---|---|---|---|
| | | | 1 hr. | 1.5 hrs. | 1 hr. | 2 hrs. | 2 hrs. |
| Example 1 | −20 +40 | 7.7 | 45.8 | | 15.2 | 13.0 | 5.8 |
| Example 2 | −20 +40 | 4.0 | 52.9 | | 22.0 | 11.2 | |
| Example 3 | −20 +40 | 9.9 | 51.1 | | 18.4 | 17.4 | |
| Example 4 | −20 +40 | 4.5 | 29.0 | | 16.7 | 12.5 | |
| Example 5 | −10 +20 | 8.1 | | 43.3 | 17.3 | 11.4 | 4.6 |

[1] The samples tested were extracted in simulated gastric fluid for a definite interval of time (1 hr.), or (1.5 hrs), then withdrawn and extracted in fresh intestinal fluid for an additional time interval (1 hr.), and withdrawn and extracted again in fresh intestinal fluid for a definite interval of time (2 hrs.), etc. The extraction liquid was analyzed in each case.

Benzyl alcohol when present in the benzyl dextran causes a lowering of the extraction rate. A number of slow release products were prepared from pure benzyl dextran and amphetamine sulfate, or hydrochloride, to which there was added fixed amounts of benzyl alcohol in each. The methods of preparation of these slow release products are given below.

*Example 6*

Small amounts of methanol were mixed into benzyl dextran (10.0 g., −60 mesh) until a total of 10 ml. was added. Benzyl alcohol (10.39 ml.) was added, followed by amphetamine sulfate (1.2 g.). The resulting paste was dried at 60° C. under vacuum, and the product was crushed to −10/20 mesh granule.

*Example 7*

The same as Example 6, using 0.72 ml. benzyl alcohol and 1.3 g. amphetamine sulfate.

*Example 8*

Same as Example 6, using only 9 ml. of methanol and adding 1.0 ml. benzyl alcohol and 1.3 g. amphetamine sulfate.

*Example 9*

Benzyl dextran (20.0 g., −60 mesh) and amphetamine sulfate (2.45 g., −60 mesh) were blended together (dry) then small amounts of methanol were mixed into the powders until a total of 18 ml. was added. Benzyl alcohol (0.95 ml.) was added, and the paste was dried at 60° C. under vacuum. The dry product was crushed to −10/20 mesh granules.

*Example 10*

Benzyl dextran (10.0 g., −40 mesh) and amphetamine hydrochloride (1.3 g.) were blended dry. A solution of benzyl alcohol (0.96 ml.) in methanol (10. ml.) was mixed into the dry powders adding it in small amounts. The paste was dried at 80° C. under vacuum. The product was crushed into −10+20 mesh granules.

The rate of extraction of amphetamine in each example was tested as previously described. The test results are set out in Table II.

TABLE II.—AMPHETAMINE EXTRACTED FROM SLOW RELEASE PRODUCTS CONTAINING BENZYL ALCOHOL TO MODIFY THE RELEASE RATE
[All samples are composed of −10 +20 mesh granules]

| Product tested | Amphet-amine in product (percent) | Benzyl alcohol added (percent) | Amphetamine extraction in simulated gastric fluid (percent) | | | Amphetamine extraction in simulated intestinal fluid (percent) | |
|---|---|---|---|---|---|---|---|
| | | | 5 min. | 1 hr. | 1.5 hrs. | 1 hr. | 2 hrs. |
| Example 6 | 8.6 | 3.5 | | 35.8 | | 9.8 | 8.6 |
| Example 7 | 11.2 | 6.2 | | 25.4 | | 7.6 | 6.6 |
| Example 8 | 8.6 | 8.4 | | | 33.6 | 3.5 | |
| Example 9 | 8.1 | 4.2 | 26.5 | | | 28.1 | 4.8 | |
| Example 10 | 10.8 | 8.1 | 5.0 | | | 8.1 | 8.1 | 10.8 |

The test results show that benzyl alcohol is effective in reducing the rate of release of the drug. Benzyl alcohol, however, tends to reduce the softening point of the benzyl dextran and thus the product is not as free flowing as when benzyl alcohol is not present.

A modified method was employed to remove benzyl alcohol and traces of benzyl chloride from the refined benzyl dextran. This involved the thorough mixing of methanol with benzyl dextran to the extent that a separate phase of methanol is present, the excess of methanol thus extracting the benzyl alcohol and benzyl chloride. The methanol with the dissolved benzyl alcohol and benzyl chloride was then drained from the benzyl dextran. After the extraction was repeated four or five times, amphetamine hydrochloride (14.1 g. per 100 g. benzyl dextran) was added to the plastic or gel consisting mass. The resultant amphetamine resin mass was then dried at 60° C. under vacuum, and the dry product was crushed into −10 to +20 mesh and −20 to +40 mesh granules.

This procedure was used to refine the benzyl dextran prior to the addition of amphetamine hydrochloride in the preparation of a large batch of slow release material. Representative samples of the −10+20 mesh granules and the −20−40 mesh granules of this slow release product were then subjected to extraction in gastric fluid for five minute and one and one-half hour intervals, and then in the intestinal fluid for one hour, two hours, and eight hour intervals. The extraction data are given in Table III.

TABLE III.—AMPHETAMINE EXTRACTED FROM A SLOW RELEASE AMPHETAMINE-BENZYL DEXTRAN PRODUCT (10% AMPHETAMINE LEVEL)

| Size of granules, mesh | Amphetamine extraction in simulated gastric fluid, percent | | Amphetamine extraction in simulated intestinal fluid, per cent | | |
|---|---|---|---|---|---|
| | 5 min. | 1.5 hrs. | 1 hr. | 2 hrs. | 8 hrs. |
| −10 +20 | 9.9 | 24.6 | 2.56 | 10.6 | |
| −20 +40 | 11.6 | 31.2 | 13.3 | 27.7 | 12.0 |

The use of amphetamine sulfate in the benzyl dextran slow release combination requires that the level of the drug in the resin be rather low. The sulfate is insoluble in the resin at the desired level of 10% free base and during the first hour of extraction the percent drug extracted is too high.

The rate of sulfate extracted can be decreased by addition of benzyl alcohol but this causes the product to become tacky and thus lose its free flowing quality. The total amount of drug extracted is greatly reduced by the addition of the benzyl alcohol and this is also objectionable. The benzyl alcohol content of the benzyl dextran should be considerably less than 5% by weight of the benzyl dextran, and preferably not higher than 1%. The rate of release of the amphetamine sulfate can also be decreased by lowering the amount of the drug in the benzyl dextran, but this is objectionable from the standpoint of capsule or pill size required for the average dosage.

Amphetamine hydrochloride is much more desirable than the sulfate because it appears to be more soluble in the benzyl dextran and also in the methanol-benzyl dextran paste used in the preparation. Using the hydrochloride it is possible to prepare a mix giving the desired rate of release and yet carrying a 10% content of amphetamine, calculated as the free base. This is the minimum desired level for convenience of capsule size.

It has also been observed that the rate of release is controlled by the amphetamine level in the product and also by the particle size which preferably should be within the range of 10–40 mesh. The rate of release of the drug as heretofore shown is greatly affected by the benzyl alcohol content. In the preparation of benzyl dextran a considerable quantity of benzyl alcohol is formed as a by-product, the removal of which is very difficult.

Various medicament drugs may be combined with benzyl dextran to form a time delay pharmaceutical product. For example, chlorpheniramine maleate (Chlor-Trimeton Maleate), 1-phenylephrine hydrochloride, methamphetamine, phenylpropanolamine, homotropine, methacopolamine, pyrilamine, codeine, dextromethorphan, and various water-soluble medicament salts such as amphetamine sulfate, racemic amphetamine sulfate as well as antihistamines and barbiturates. Inert fillers may be added in suitable amounts as desired, e.g., terra alba, starch and the like, and such as is commonly added in the formulation of tablets of the product.

Various changes and substitutions may be made by those skilled in the art to obtain the advantages and achieve the results of this invention and it is understood such changes and variations are within the scope of the foregoing except as stricted in the claims.

What is claimed is:

1. A pharmaceutical product providing a gradual release of medicament over a long period of time, and which comprises an amphetamine medicament disposed in benzyl dextran, said product being free of benzyl alcohol.

2. A pharmaceutical product providing a gradual release of medicament over a long period of time, and which comprises an amphetamine medicament dispersed in benzyl dextran, said medicament comprising amphetamine and benzyl dextran, said benzyl dextran being free of benzyl alcohol.

3. A pharmaceutical product providing a gradual release of medicament over a long period of time, and which comprises an amphetamine medicament dispersed in benzyl dextran, said medicament comprising an amphetamine salt and benzyl dextran and which product is free of benzyl alcohol.

4. A pharmaceutical product providing a gradual release of medicament over a long period of time, and which comprises an amphetamine medicament dispersed in benzyl dextran, said medicament comprising amphetamine sulfate and benzyl dextran which is free of benzyl alcohol, and said product being in the form of solid particles of a particle size between −20 and +40 mesh.

5. A pharmaceutical product providing a gradual release of medicament over a long period of time, and which comprises an amphetamine medicament dispersed in benzyl dextran, said medicament comprising amphetamine hydrochloride and benzyl dextran which is free of benzyl alcohol, and said product being in the form of solid particles of a particle size between −20 and +40 mesh.

6. A pharmaceutical product providing a gradual release of medicament over a long period of time, and which comprises an amphetamine medicament dispersed in benzyl dextran, said medicament comprising amphetamine sulfate and benzyl dextran which is free of benzyl alcohol, and said product being in the form of solid particles of a particle size between −10 and +20 mesh.

7. A pharmaceutical product which comprises benzyl dextran amphetamine preparation characterized by a controlled release of the amphetamine in the body over an extended period of time, said preparation being free of benzyl alcohol.

8. In a method of regulating the release of an amphetamine in the body from an amphetamine dispersed in benzyl dextran free of benzyl alcohol, the improvement which consists in removing by steam distillation any benzyl alcohol present with the benzyl dextran before dispersing the amphetamine in the said benzyl dextran.

9. In a method of effecting the controlled release of an amphetamine from compositions comprising an amphetamine dispersed in benzyl dextran produced by reacting a benzyl halide with dextran, the improvement which consists of removing by distillation the excess benzyl alcohol and excess benzyl halide from the said benzyl dextran before dispersing the said amphetamine in the benzyl dextran.

References Cited in the file of this patent

UNITED STATES PATENTS

| | | |
|---|---|---|
| 2,536,168 | Goggin | Jan. 5, 1951 |
| 2,609,368 | Gaver | Sept. 2, 1952 |
| 2,749,274 | Buckwalter | June 5, 1956 |
| 2,811,516 | Novak | Oct. 29, 1957 |
| 2,856,398 | Novak | Oct. 14, 1958 |
| 2,885,393 | Herb | May 5, 1959 |
| 2,902,408 | Bouman et al. | Sept. 1, 1959 |

OTHER REFERENCES

Whistler et al.: "Industrial Gums, Polysaccharides, and Their Derivatives," pages 1–14 and 531–563, Library of Congress copyright Date Aug. 4, 1959, published by Academic Press, N.Y., N.Y.